(12) United States Patent
Kim et al.

(10) Patent No.: US 7,715,967 B2
(45) Date of Patent: May 11, 2010

(54) HYDRAULIC CONTROLLER AND CONTROL METHOD WITH PRESSURE AND OIL-CONDITION SENSING AND FAILURE

(75) Inventors: Jonggap Kim, Shizuoka (JP); Yasushi Yabe, Shizuoka (JP); Seiichiro Takahashi, Shizuoka (JP)

(73) Assignee: JATCO Ltd, Fuji-shi (JP)

( * ) Notice: Subject to any disclaimer, the term of this patent is extended or adjusted under 35 U.S.C. 154(b) by 1367 days.

(21) Appl. No.: 11/148,163

(22) Filed: Jun. 9, 2005

(65) Prior Publication Data

US 2005/0278102 A1 Dec. 15, 2005

(30) Foreign Application Priority Data

Jun. 10, 2004 (JP) ............... 2004-172385

(51) Int. Cl.
G06F 7/00 (2006.01)
G06F 17/00 (2006.01)

(52) U.S. Cl. ............... 701/53; 701/51; 474/28; 477/43

(58) Field of Classification Search .................. None
See application file for complete search history.

(56) References Cited

U.S. PATENT DOCUMENTS

| | | | | |
|---|---|---|---|---|
| 5,074,166 | A * | 12/1991 | Yamashita et al. ............ | 477/39 |
| 6,328,673 | B1 * | 12/2001 | Monowa et al. ............. | 477/120 |
| 6,907,970 | B2 * | 6/2005 | Sugimura .................. | 188/382 |
| 7,104,907 | B2 * | 9/2006 | Jozaki et al. .................. | 474/28 |
| 7,169,070 | B2 * | 1/2007 | Jozaki et al. .................. | 474/28 |
| 7,192,372 | B2 * | 3/2007 | Sawada ....................... | 474/28 |
| 2002/0046618 | A1 * | 4/2002 | Yamashita et al. ............ | 74/335 |
| 2005/0192133 | A1 * | 9/2005 | Oshiumi et al. ............... | 474/18 |

FOREIGN PATENT DOCUMENTS

| | | |
|---|---|---|
| JP | 2000-085554 A | 3/2000 |
| JP | 2002-227990 A | 8/2002 |

* cited by examiner

*Primary Examiner*—Thomas G Black
*Assistant Examiner*—Sze-Hon Kong
(74) *Attorney, Agent, or Firm*—Foley & Lardner LLP

(57) ABSTRACT

A hydraulic controller includes an actuator for electrically controlling the hydraulic pressure, a hydraulic-pressure sensing part for sensing an actual value of the hydraulic pressure in the actuator, and an ECU for controlling the actuator. The ECU includes a fundamental hydraulic-pressure value command part for carrying out setting and command of a fundamental hydraulic-pressure command value, a feedforward control part for calculating through an inverse filter a first target hydraulic-pressure command value in accordance with the fundamental hydraulic-pressure command value, a feedback control part for calculating a second target hydraulic-pressure command value in accordance with the sensed actual value of the hydraulic pressure and the fundamental hydraulic-pressure command value, and a target control-amount determination part for determining a target control amount of the actuator in accordance with the first and second target hydraulic-pressure command value, wherein the ECU controls the actuator in accordance with the determined target control amount.

11 Claims, 6 Drawing Sheets

PRESENT INVENTION

HYDRAULIC CONTROLLER AND CONTROL METHOD WITH PRESSURE AND OIL-CONDITION SENSING AND FAILURE

BACKGROUND OF THE INVENTION

The present invention relates to a hydraulic controller, and more particularly, to a controller for a hydraulic actuator for electrically controlling the hydraulic pressure.

As is disclosed in Japanese document P2000-85554A, in the controller for a hydraulic actuator for electrically controlling the hydraulic pressure, typically, judder resulting from hydraulic vibrations is avoided by arranging a hydraulic damper independently of the hydraulic controller wherein the hydraulic damper produces hydraulic pressure of opposite phase to that of the hydraulic pressure of the hydraulic controller, thus restraining hydraulic vibrations. However, this solution requires arrangement of hydraulic damper independently of the hydraulic controller, leading to increasing the size and manufacturing cost of the system.

SUMMARY OF THE INVENTION

In another solution for restraining hydraulic vibrations without relying on the hydraulic damper, a primary lag filter is used for control of the hydraulic actuator wherein the lag characteristics of the primary lag filter are changed as required in accordance with the control conditions.

However, this solution raises a problem that when reducing the lag characteristics of the filter, the responsivity is enhanced while the vibrations restraint-ability is degraded, and when increasing the lag characteristics of the filter, the vibrations restraint-ability is enhanced while the responsivity is degraded. In a continuously variable transmission (CVT) which ensures torque transmission through belts by hydraulically controlling pulleys, particularly, occurrence of hydraulic vibrations causes unstable contact between the pulleys and the belts so that torque transmission from the pulleys to the belts becomes deficient, resulting in no achievement of desired torque. Moreover, belt slippage may cause poor fuel consumption and degradation of the life of the pulley and belts.

It is, therefore, an object of the present invention to provide a hydraulic controller which allows enhancement in both the responsivity and the vibrations restraint-ability.

Generally, the present invention provides a hydraulic controller, which comprises: an actuator which electrically controls a hydraulic pressure; a hydraulic-pressure sensing part which senses an actual value of the hydraulic pressure in the actuator; and an electronic control unit (ECU) which controls the actuator, the ECU comprising: a fundamental hydraulic-pressure value command part which carries out setting and command of a fundamental hydraulic-pressure command value; a feedforward control part which calculates through an inverse filter a first target hydraulic-pressure command value in accordance with the fundamental hydraulic-pressure command value; a feedback control part which calculates a second target hydraulic-pressure command value in accordance with the sensed actual value of the hydraulic pressure and the fundamental hydraulic-pressure command value; and a target control-amount determination part which determines a target control amount of the actuator in accordance with the first and second target hydraulic-pressure command value, the ECU controlling the actuator in accordance with the determined target control amount.

One aspect of the present invention is to provide a method of controlling a hydraulic controller which comprises an actuator electrically controlling a hydraulic pressure and a hydraulic-pressure sensing part sensing an actual value of the hydraulic pressure in the actuator, wherein the method comprises: carrying out setting and command of a fundamental hydraulic-pressure command value; calculating through an inverse filter a first target hydraulic-pressure command value in accordance with the fundamental hydraulic-pressure command value; calculating a second target hydraulic-pressure command value in accordance with the sensed actual value of the hydraulic pressure and the fundamental hydraulic-pressure command value; determining a target control amount of the actuator in accordance with the first and second target hydraulic-pressure command value; and controlling the actuator in accordance with the determined target control amount.

BRIEF DESCRIPTION OF THE DRAWINGS

The other objects and features of the present invention will become apparent from the following description with reference to the accompanying drawings, wherein.

DETAILED DESCRIPTION OF THE INVENTION

Figure 1:
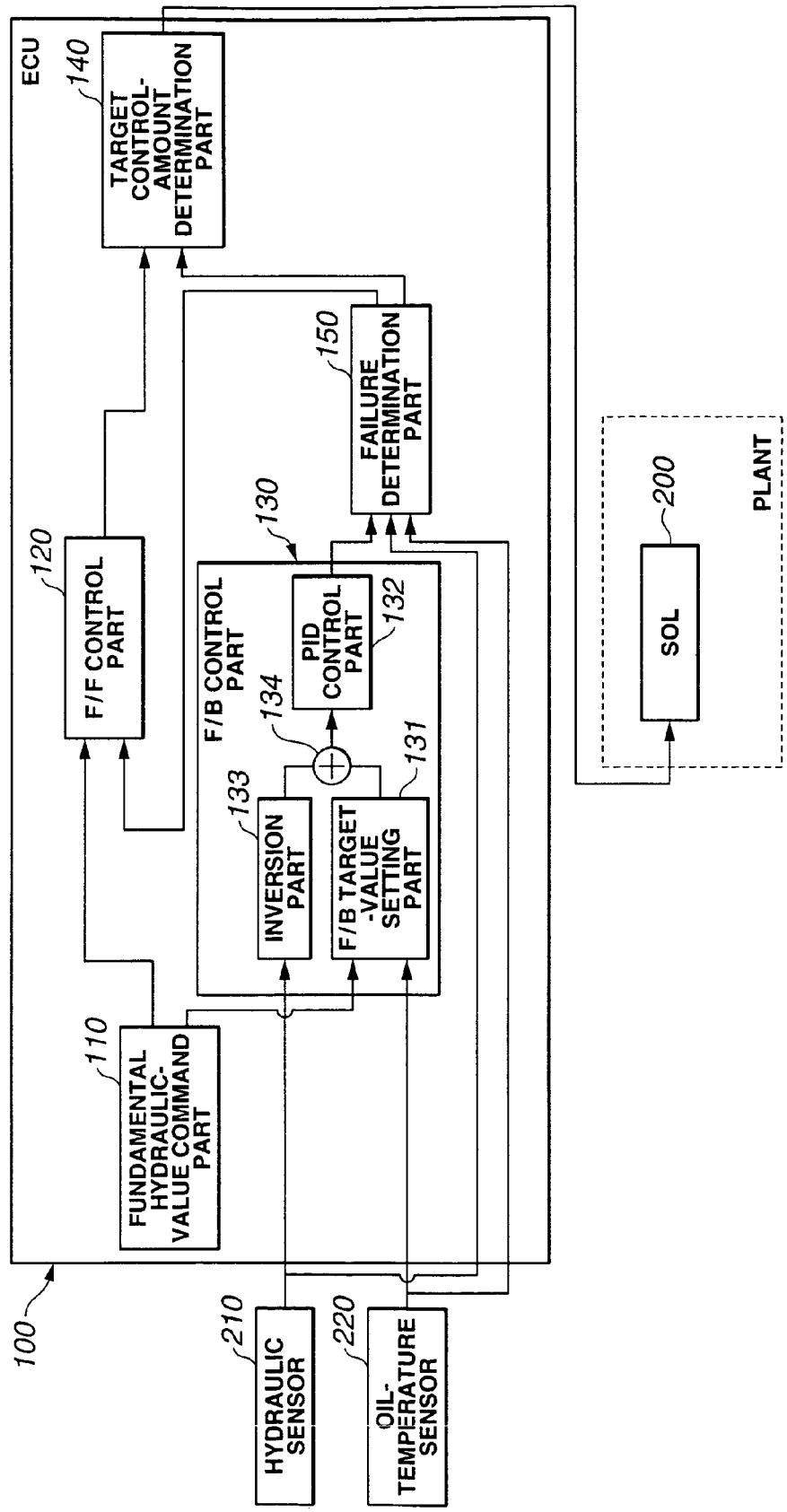
FIG. 1 is a block diagram showing a first embodiment of a hydraulic controller according to the present invention.

Referring to the drawings, a description will be made about preferred embodiments of a hydraulic controller according to the present invention.

FIG. 1 shows first embodiment of the present invention. Referring to FIG. 1, the hydraulic controller comprises an electronic control unit (ECU) 100 comprising a fundamental hydraulic-value command part 110, a feedforward (F/F) control part 120, a feedback (F/B) control part 130, a target control-amount determination part 140, and a failure determination part 150.

A control target of the ECU 100 is a solenoid 200 as a hydraulic actuator, which is controlled in accordance with detection values of a hydraulic sensor 210 and an oil-temperature sensor 220 arranged in a plant to which the hydraulic controller is applied and other status amounts. The plant to which the hydraulic controller is applied includes a hydraulic apparatus for a motor vehicle, for example. Optionally, the plant may include other apparatus on condition that hydraulic control is carried out therein.

In the first embodiment, due to great influence of the oil viscosity exerted on hydraulic control, control is carried out using the oil temperature as an oil-viscosity estimation parameter. Optionally, other method which allows estimation of the oil viscosity may be adopted. By way of example, the oil viscosity can be estimated from a time gradient of the hydraulic pressure at a specific spot.

The fundamental hydraulic-value command part 110 comprises a hydraulic map corresponding to the status amounts of a control target of the hydraulic controller. In accordance with the status amounts, a fundamental hydraulic-pressure command value for the plant is read from the hydraulic map, and is provided to the F/F control part 120 and the F/B control part 130. When the plant includes a drive hydraulic apparatus for a motor vehicle, for example, the status amounts of the control target may be a throttle-valve opening TVO and a vehicle speed VSP.

The F/F control part 120 includes an opposite-phase compensator provided with inverse filters. If the failure determination part 150 determines that no failure is found in the oil-temperature sensor 220, an oil temperature Tc detected by the failure determination part 150 is provided to the F/F control part 120. In accordance with the oil temperature Tc, the F/F control part 120 carries out, through the inverse filter, opposite-phase compensation of a fundamental hydraulic-pressure command value P* provided from the fundamental hydraulic-value command part 110, outputting to the target control-mount determination part 140 a first target hydraulic-pressure command value $P_1$ having intensively suppressed vibration area of the fundamental hydraulic-pressure command value P*.

The F/F control part 120 comprises inverse filters set for oil temperatures, and ensures opposite-phase compensation by selecting from the inverse filters an optimum inverse filter corresponding to the detected oil temperature Tc. If the failure determination part 150 determines that the oil temperature 220 is faulty, an inverse filter corresponding to a predetermined oil temperature is selected from the inverse filters. The predetermined oil temperature is an oil temperature in a normal range of the plant. When the oil temperature 220 is faulty, an inverse filter is used corresponding to a normal range having higher service frequency.

The F/B control part 130 includes a proportional-integral-derivative (PID) controller provided with a F/B target-value setting part 131 and a PID control part 132. The F/B target-value setting part 131 comprises a filter for calculating a target hydraulic-pressure command value $P_{FB}$ for F/B control in accordance with an actual hydraulic pressure Pc detected by the hydraulic sensor 210 and the oil temperature Tc detected by the oil-temperature sensor 220. The F/B target-value setting part 131 calculates target hydraulic-pressure command value $P_{FB}$ to provide it to an adder 134.

The F/B target-value setting part 131 also comprises a plurality of filters set for oil temperatures, and ensures setting of the target hydraulic-pressure command value $P_{FB}$ by selecting an optimum filter corresponding to the detected oil temperature Tc.

An inversion part 133 inverts a value of the actual hydraulic pressure Pc detected by the hydraulic sensor 210 to provide it to the adder 134. The adder 134 adds the target hydraulic-pressure command value $P_{FB}$ and an inverted value−Pc to provide a value $P_{FB}$−PC to the PID control part 132.

Receiving input of the value $P_{FB}$−PC, the PID control part 132 carries out PID control so that a value of the actual hydraulic pressure Pc follows the target hydraulic-pressure command value $P_{FB}$ for F/B control, outputting a second target hydraulic-pressure command value $P_2$ to the failure determination part 150.

The failure determination part 150 includes a failure detection part for determining a failure of the hydraulic sensor 210 and the oil-temperature sensor 220. If no failure is detected in the two sensors 210, 220, the failure determination part 150 provides second target hydraulic-pressure command value $P_2$ to the target control-amount determination part 140. On the other hand, if a failure is detected in any of the two sensors 210, 220, the failure determination part 150 does not provide second target hydraulic-pressure command value $P_2$.

When the temperature is very low, the oil viscosity increases to make detection of the hydraulic pressure difficult, leading to poor accuracy of F/B control of the hydraulic pressure. Under such conditions, the control amount of the plant is determined by F/F control only without relying on F/B control, achieving enhancement in control accuracy. Consequently, when the detected oil temperature Tc is smaller than a predetermined value as well, the failure determination part 150 does not provide second target hydraulic-pressure command value $P_2$.

The target control-amount determination part 140 includes a control part for carrying out hydraulic control of the plant through current control of the solenoid 200. In accordance with the first target hydraulic-pressure command value $P_1$ and the second target hydraulic-pressure command value $P_2$ provided from the F/F control part 120 and the failure determination part 150, the target control-amount determination part 140 determines a target control amount of the solenoid 200, which is converted into a corresponding target current it to provide it to the solenoid 200.

When determining a target control amount, the first target hydraulic-pressure command value $P_1$ and second target hydraulic-pressure command value $P_2$ as provided are multiplied by independent gains $K_1$, $K_2$, respectively, and are superimposed one upon another. Optimum control is ensured by changing the gains $K_1$, $K_2$ in accordance with the conditions of oil and the plant. When the second target hydraulic-pressure command value $P_2$ is not provided due to failure of the oil-temperature sensor 220 or the hydraulic sensor 210, or when the detected oil temperature Tc is smaller than a predetermined value, the gain $K_1$ as a multiplier of the first target hydraulic-pressure command value $P_1$ is set at 1 to determine a target control amount in accordance with the first target hydraulic-pressure command value $P_1$ only.

Figure 2:
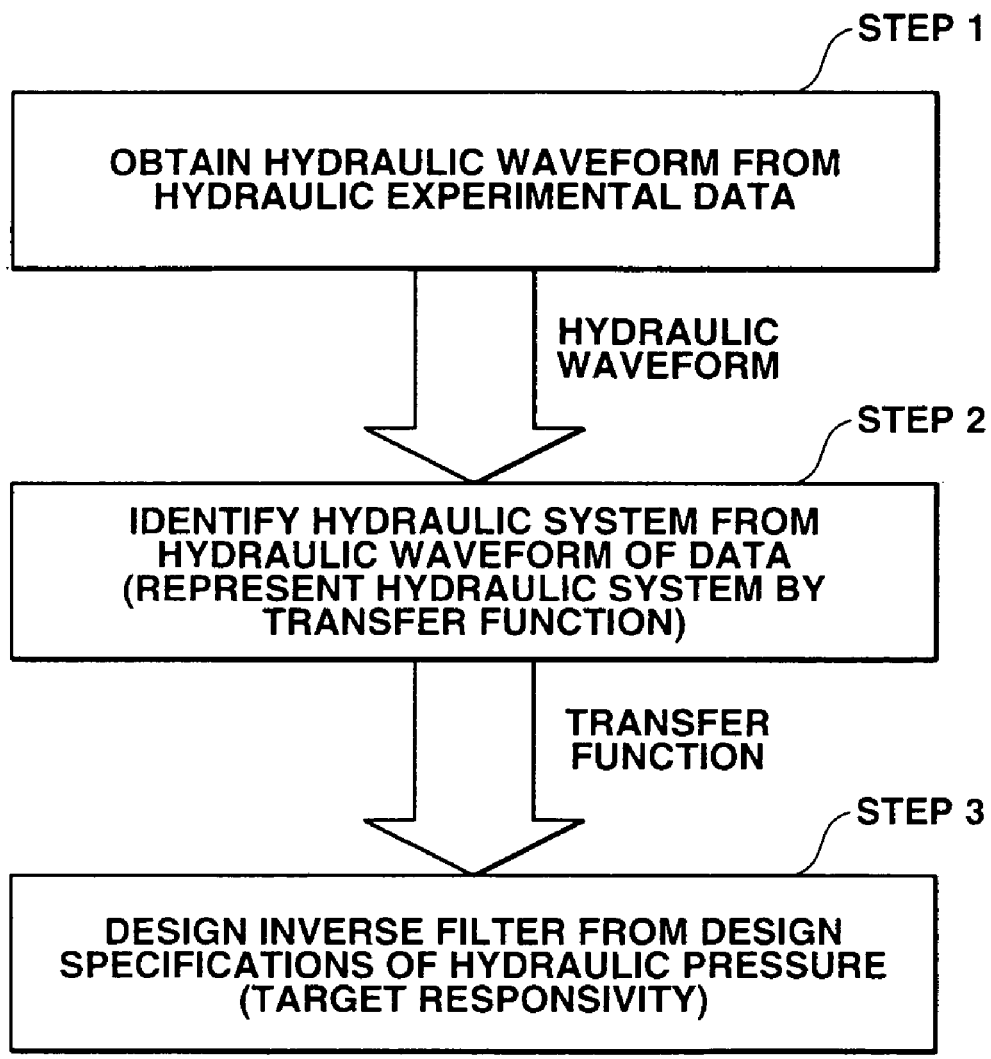
FIG. 2 is a chart showing a method of designing an inverse filter in a feedforward (F/F) control part in the first embodiment.

FIG. 2 shows a method of designing the inverse filter in the F/F control part 120. Since the hydraulic characteristics differ according to the plant to which the hydraulic controller is applied, first, the hydraulic waveform of the plant is detected under specific oil-temperature conditions by experiment (step 1). Then, the obtained hydraulic waveform is converted into a transfer function (step 2). Finally, considering a target hydraulic responsivity of the plant, the inverse filter is designed out of the transfer function (step 3). Moreover, a plurality of inverse filters are obtained by changing the oil-temperature conditions, obtaining a group of inverse filters covering all oil-temperature area corresponding to an operation area of the plant.

The filter for calculating the target hydraulic-pressure command value $P_{FB}$ for F/B control includes a primary lag filter. In the same way as the design of the inverse filter, since the hydraulic characteristics differ according to the plant, first, the filter is designed by obtaining a time constant under specific oil-temperature conditions. Then, by changing the oil-temperature conditions, it is obtained a group of filters covering all oil-temperature area corresponding to an operation area of the plant.

Figure 3:
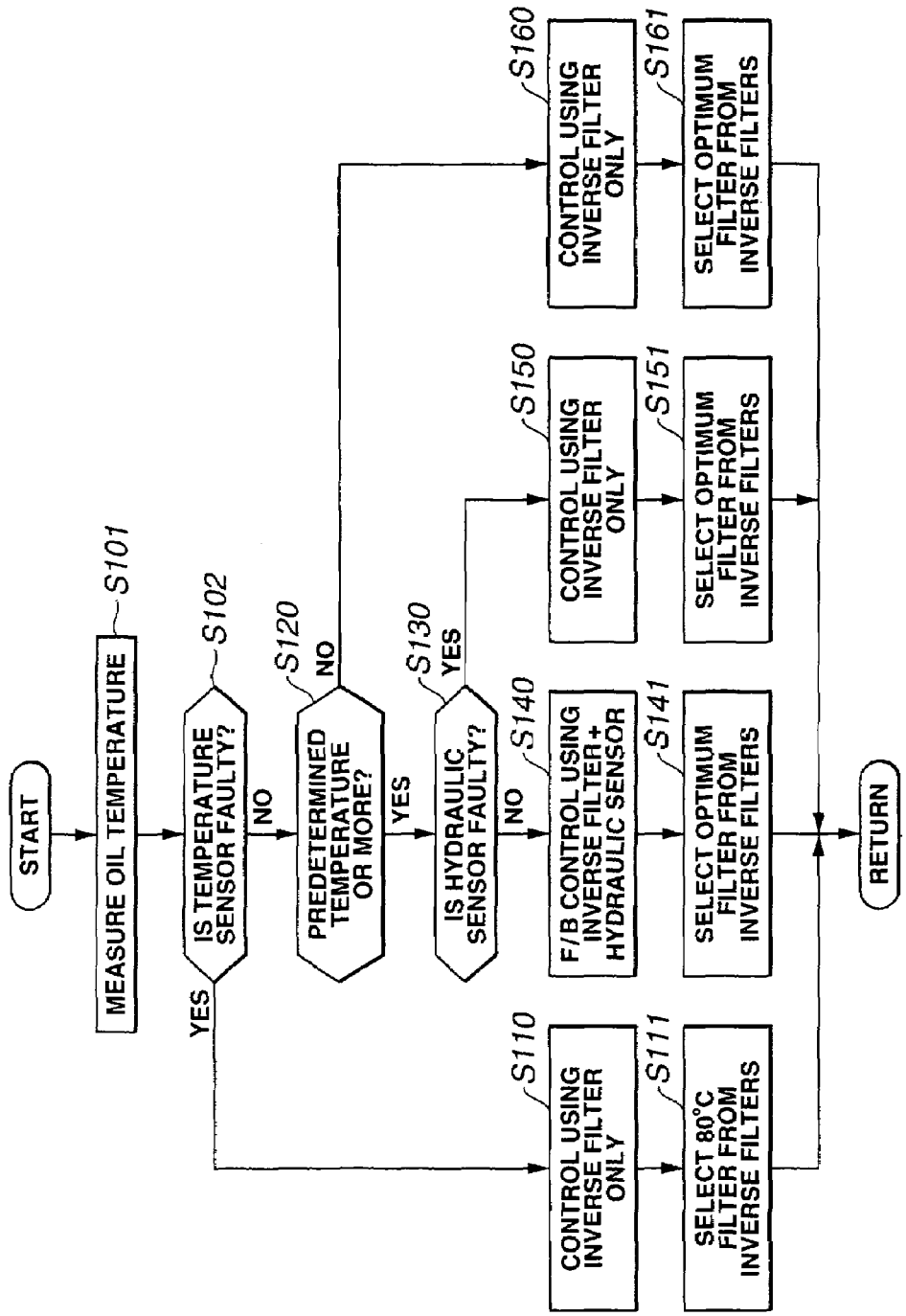
FIG. 3 is a flowchart showing flow of hydraulic control processing carried out by an electronic control unit (ECU) in the first embodiment.

FIG. 3 shows flow of hydraulic control processing carried out by the ECU 100. Referring to FIG. 3, the steps will be described.

At a step S101, the oil temperature is detected by the oil-temperature sensor 220, then, flow proceeds to a step S102.

At the step S102, the failure determination part 150 determines whether or not the oil-temperature sensor 220 is faulty.

If the answer is YES, flow proceeds to a step S110, whereas if the answer is NO, flow proceeds to a step S120.

At the step S110, the failure determination part 150 determines a target control amount in accordance with only the first target hydraulic-pressure command value $P_1$ of the F/F control part 120 using the inverse filter without having output of the second target hydraulic-pressure command value $P_2$ of the F/B control part 130. Then, flow proceeds to a step S111.

At the step S111, the F/F control part 120 selects a predetermined inverse filter from the plurality of inverse filters, then, flow comes to an end.

At the step S120, the failure determination part 150 determines whether or not the oil temperature is equal to or greater than a predetermined value. If the answer is YES, flow proceeds to a step S130, whereas the answer is NO, flow proceeds to a step S160.

At the step S130, the failure determination part 150 determines whether or not the hydraulic sensor 210 is faulty. If the answer is YES, flow proceeds to a step S150, whereas the answer is NO, flow proceeds to a step S140.

At the step S140, the failure determination part 150 determines a target control amount in accordance with the first and second target hydraulic-pressure command values $P_1$, $P_2$ calculated by the F/F control part 120 and the F/B control part 130. Then, flow proceeds to a step S141.

At the step S141, the F/F control part 120 selects a predetermined inverse filter from the plurality of inverse filters, then, flow comes to an end.

At the step S150, the failure determination part 150 determines a target control amount in accordance with only the first target hydraulic-pressure command value $P_1$ of the F/F control part 120 using the inverse filter without having output of the second target hydraulic-pressure command value $P_2$ of the F/B control part 130. Then, flow proceeds to a step S151.

At the step S151, the F/F control part 120 selects a predetermined inverse filter from the plurality of inverse filters, then, flow comes to an end.

At the step S160, the failure determination part 150 determines a target control amount in accordance with only the first target hydraulic-pressure command value $P_1$ of the F/F control part 120 using the inverse filter without having output of the second target hydraulic-pressure command value $P_2$ of the F/B control part 130. Then, flow proceeds to a step S161.

At the step S161, the F/F control part 120 selects a predetermined inverse filter from the plurality of inverse filters, then, flow comes to an end.

Figure 4A:
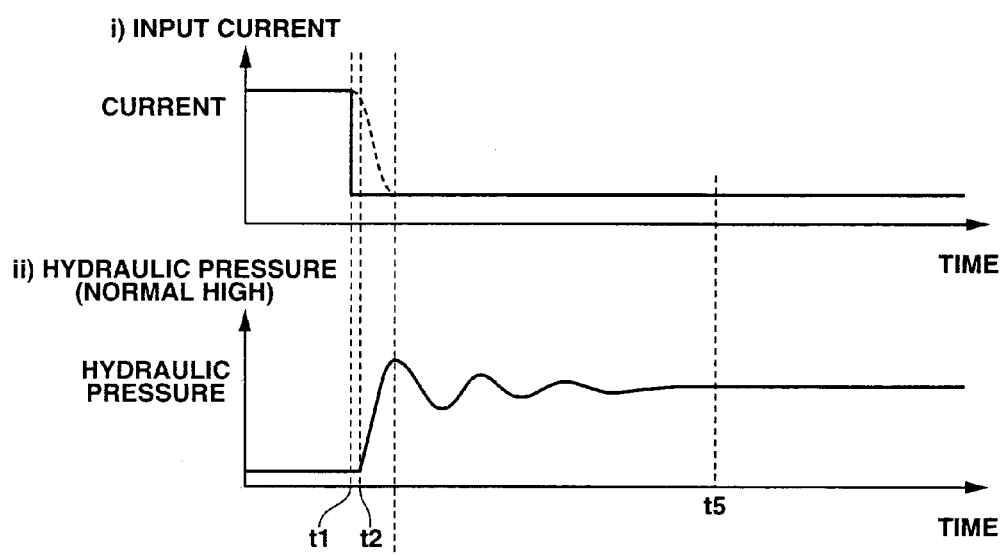
FIGS. 4A and 4B are time charts showing secular changes in current and hydraulic pressure in the related art and the present invention.
Figure 4B:
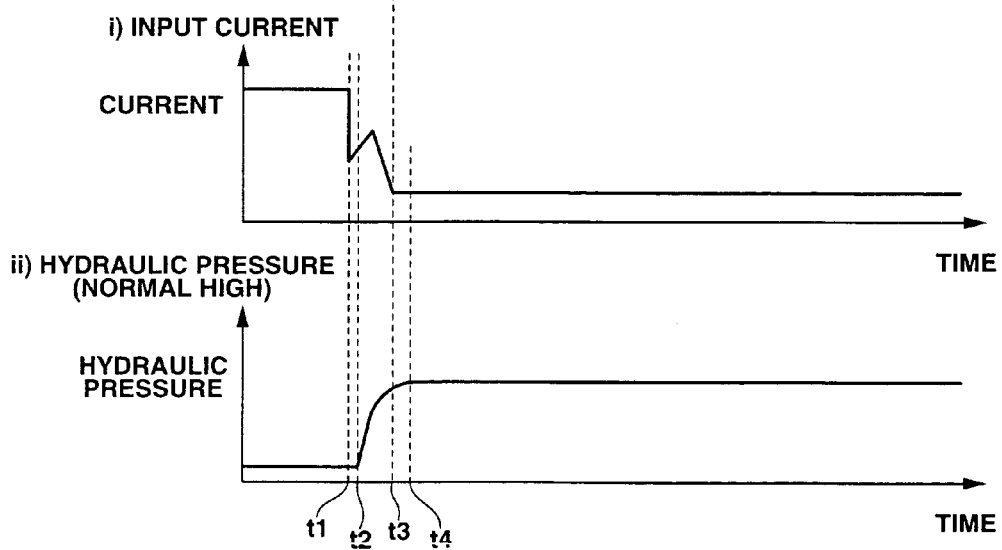

Referring to FIGS. 4A and 4B, secular changes during hydraulic control will be compared between the related art and the present invention. FIGS. 4A and 4B show secular changes in current and hydraulic pressure in the related art without using inverse filter and the present invention.

At time $t_1$, input current starts to vary. In the first embodiment, due to use of the inverse filter, input current does not vary stepwise, nor converge, whereas in the related art, due to simple application of step current, input current converges to a predetermined value at time $t_1$.

At time $t_2$, both in the related art and in the first embodiment, the hydraulic pressure starts to respond. In the related art, input current is already at a given value, whereas in the first embodiment using the inverse filter, input current continues to vary.

At time $t_3$, in the first embodiment, input current converges to a predetermined value. Both in the related art and in the first embodiment, the hydraulic pressure continues to vary.

At time $t_4$, in the first embodiment, the hydraulic pressure converges to a predetermined value, and completes its response, whereas in the related art, the hydraulic pressure does not converges yet, and still continues to vary.

At time $t_5$, in the related art, the hydraulic pressure converges, and completes its response.

Operation will be compared between the related art and the present invention. In the related art, the primary lag filter is used for control of the hydraulic actuator, wherein the lag characteristics of the primary lag filter are changed as required in accordance with the control conditions. However, the related art raises a problem that when reducing the lag characteristics of the filter, the responsivity is enhanced while the vibrations restraint-ability is degraded, and when increasing the lag characteristics of the filter, the vibrations restraint-ability is enhanced while the responsivity is degraded. Moreover, due to the control structure using the primary lag filter only, there is a limit to enhancement in vibrations restraint-ability even when increasing the lag characteristics.

On the other hand, in the first embodiment, using an inverse filter corresponding to the detected oil temperature, the F/F control part 120 carries out opposite-phase compensation of the fundamental hydraulic-pressure command value P* provided from the fundamental hydraulic-value command part 110, through the inverse filter, calculating the first target hydraulic-pressure command value $P_1$ having intensively suppressed vibration area of the fundamental hydraulic-pressure command value P*. The F/B control part 130 carries out control so that a value of the actual hydraulic pressure Pc follows the target hydraulic-pressure command value $P_{FB}$ for F/B control, calculating the second target hydraulic-pressure command value $P_2$. And the target control-amount determination part 140 multiplies the first and second target hydraulic-pressure command values $P_1$, $P_2$ by the independent gains $K_1$, $K_2$, respectively, which are superimposed one upon another, thus determining a target control amount for ensuring control of the solenoid 200.

With this, using the inverse filter, intensive opposite-phase compensation is provided to the vibration area, allowing provision of the hydraulic controller having both responsivity and vibrations restraint-ability enhanced (which corresponds to claim 1).

Further, the F/F control part 120 comprises a plurality of inverse filters set for oil temperatures, and ensures opposite-phase compensation by selecting from the inverse filters an optimum inverse filter corresponding to the detected oil temperature Tc. With this, an optimum inverse filter can be used regardless of an oil-temperature value, resulting in achievement of effective vibrations restraint (which corresponds to claim 2).

Still further, when the failure determination part 150 determines that the hydraulic sensor 210 is faulty, the F/F control part 120 selects from the inverse filters an inverse filter corresponding to a predetermined oil temperature to output the first target hydraulic-pressure command value $P_1$, and the failure determination part 150 does not output to the target control-amount determination part 140 the second target hydraulic-pressure command value $P_2$ input from the F/B control part 130. Moreover, the target control-amount determination part 140 sets the gain $K_1$ as a multiplier of the first target hydraulic-pressure command value $P_1$ at 1 to determine a target control amount in accordance with the first target hydraulic-pressure command value $P_1$ only. With this, even if the hydraulic sensor 210 is faulty, control using the inverse filter allows achievement of control with hydraulic vibrations restrained (which corresponds to claim 3).

Furthermore, when the failure determination part 150 determines that the oil-temperature sensor 220 is faulty, the F/F control part 120 selects from the inverse filters an inverse filter corresponding to a predetermined oil temperature to output the first target hydraulic-pressure command value $P_1$, and the failure determination part 150 does not output to the target control-amount determination part 140 the second target hydraulic-pressure command value $P_2$ input from the F/B control part 130. Moreover, the target control-amount determination part 140 sets the gain $K_1$ as a multiplier of the first target hydraulic-pressure command value $P_1$ at 1 to determine a target control amount in accordance with the first target hydraulic-pressure command value $P_1$ only. With this, even if the oil-temperature sensor 220 is faulty, control using the inverse filter allows achievement of control with hydraulic vibrations restrained (which corresponds to claim 4).

Further, the use of the oil-temperature sensor 220 allows effective selection of the inverse filter while avoiding a cost increase. Moreover, selection of the inverse filter is carried out using as a parameter the oil temperature which exerts a great influence on the oil characteristics, allowing achievement of more accurate control (which corresponds to claim 5).

Still further, when the oil-temperature sensor 220 is faulty, F/F control is carried out using the inverse filter corresponding to the oil temperature in a normal range of the plant. Thus, even if the oil-temperature sensor 220 is faulty, the hydraulic-vibrations controllability is secured in at least a normal range having higher service frequency, allowing operation of the plant while maximally restraining hydraulic vibrations (which corresponds to claim 6).

Furthermore, when the detected oil temperature Tc is smaller than a predetermined value as well, the failure determination part 150 does not provide second target hydraulic-pressure command value $P_2$. With this, even if accurate detection of the hydraulic pressure is difficult to carry out due to degradation of the hydraulic responsivity caused by a rise in oil viscosity, it can be avoided occurrence of hydraulic vibrations resulting from F/B control when having erroneous detection of the hydraulic pressure, resulting in enhancement in control accuracy (which corresponds to claim 7).

Figure 5:
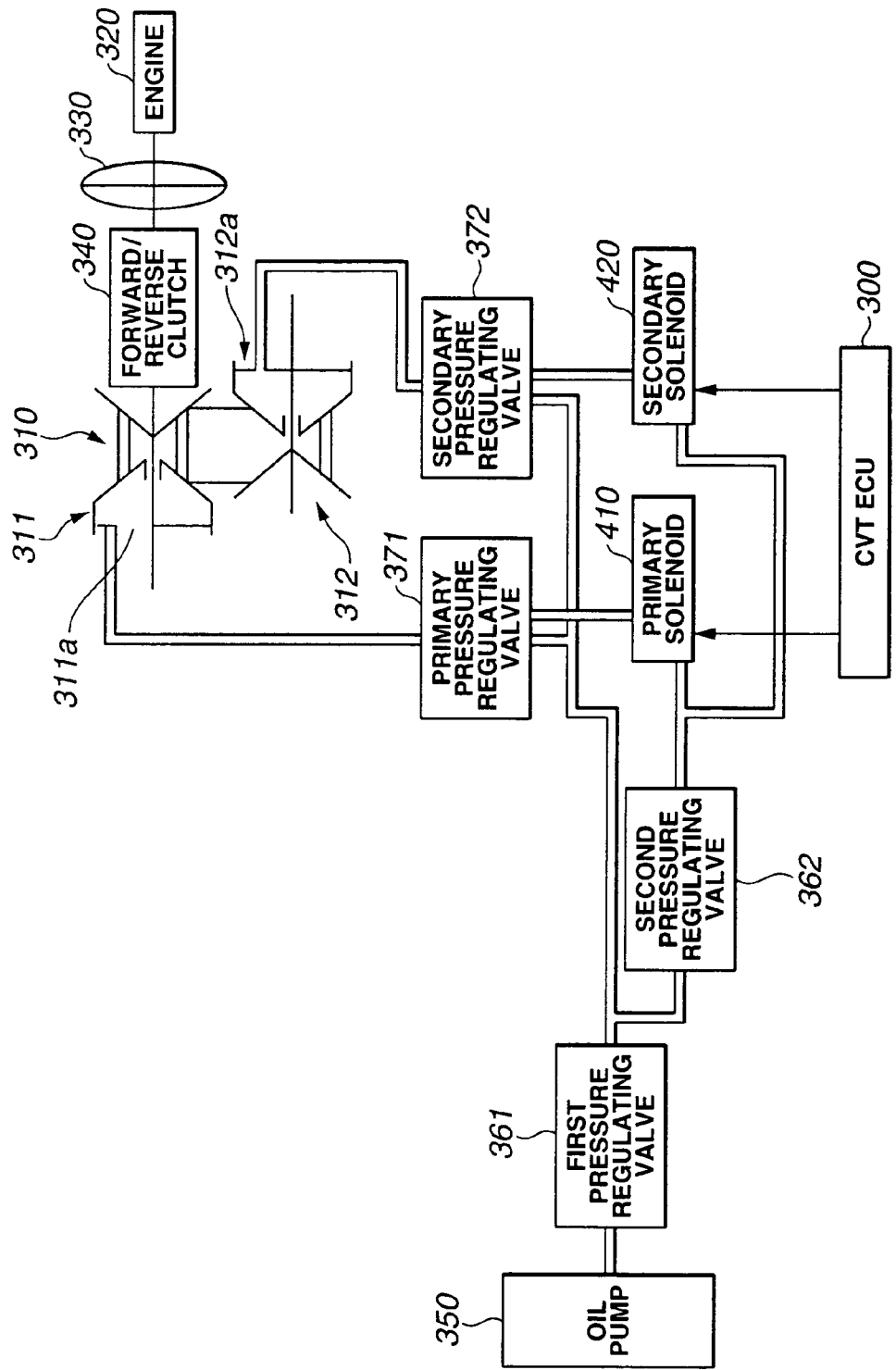
FIG. 5 is a block diagram showing a system configuration of a CVT mounted motor vehicle to which a second embodiment of the present invention is applied.

Referring to FIG. 5, in order to show a specific operation of the hydraulic controller as described above, a second embodiment of the present invention will be described in connection with an application to the CVT for carrying out shifting by independently controlling the hydraulic pressures applied to the drive and driven pulleys as an example of plants to which the hydraulic controller is applied. Since the hydraulic controller in the second embodiment is substantially the same in control structure and processing as that in the first embodiment, only a specific structure required when the hydraulic controller is applied to the CVT will be described.

Referring to FIG. 5, the motor vehicle to which the hydraulic controller is applied comprises a CVT electronic control unit (ECU) 300, an engine 320, a torque converter 330, a forward/reverse clutch 340, an oil pump 350, a first pressure regulating valve 361, a second pressure regulating valve 362, a CVT 310, a primary solenoid 410, a secondary solenoid 420, a primary pressure regulating valve 371, and a secondary pressure regulating valve 372.

The CVT ECU 300 has the fundamental structure similar to that of the ECU 100 in the first embodiment, and the primary solenoid 410 and secondary solenoid 420 correspond to the solenoid 200 in the first embodiment.

Power of the engine 320 is transmitted to the CVT 310 through the torque converter 330 and the forward/reverse clutch 340. The CVT 310 comprises a drive-side primary pulley 311 and a driven-side secondary pulley 312, and ensures power transmission through a belt interposed between the two.

The CVT 310 includes a CVT for carrying out shifting by independently controlling the hydraulic pressures applied to the drive and driven pulleys. The primary pulley 311 and the secondary pulley 312 comprise a primary slide pulley 311a and a secondary slide pulley 312a, respectively. By hydraulically sliding the primary slide pulley 311a and the secondary slide pulley 312a, the radiuses of rotation of the belt on the drive side and on the driven side are changed independently, achieving shifting.

The oil pump 350 is a hydraulic source which feeds oil to the primary and secondary pressure regulating valves 371, 372 through the first pressure regulating value 361, and to the primary and secondary solenoids 410, 420 through the second pressure regulating valve 362. The primary and secondary solenoids 410, 420 include solenoid valves controlled by the CVT ECU 300, and are connected to the primary and secondary pressure regulating valves 371, 372 respectively, to carry out control.

The hydraulic pressure produced by the oil pump 350 is adjusted by the first pressure regulating valve 361 to provide the line pressure, which is fed to the primary and secondary pressure regulating valves 371, 372. Moreover, the hydraulic pressure is adjusted by the second pressure regulating valve 362 to provide the pilot pressure, which is fed to the primary and secondary solenoids 410, 420. The CVT ECU 300 controls the primary and secondary solenoids 410, 420 to adjust the fed pilot pressure at a desired signal pressure, which is fed to the primary and secondary pressure regulating valves 371, 372.

The primary and second pressure regulating valves 371, 372 adjust the line pressure in accordance with the fed signal pressure, which is fed to the primary and secondary slide pulleys 311a, 312a to slide them. As described above, the CVT ECU 300 controls the primary and secondary solenoids 410, 420 to achieve shifting of the CVT 310.

Figure 6:
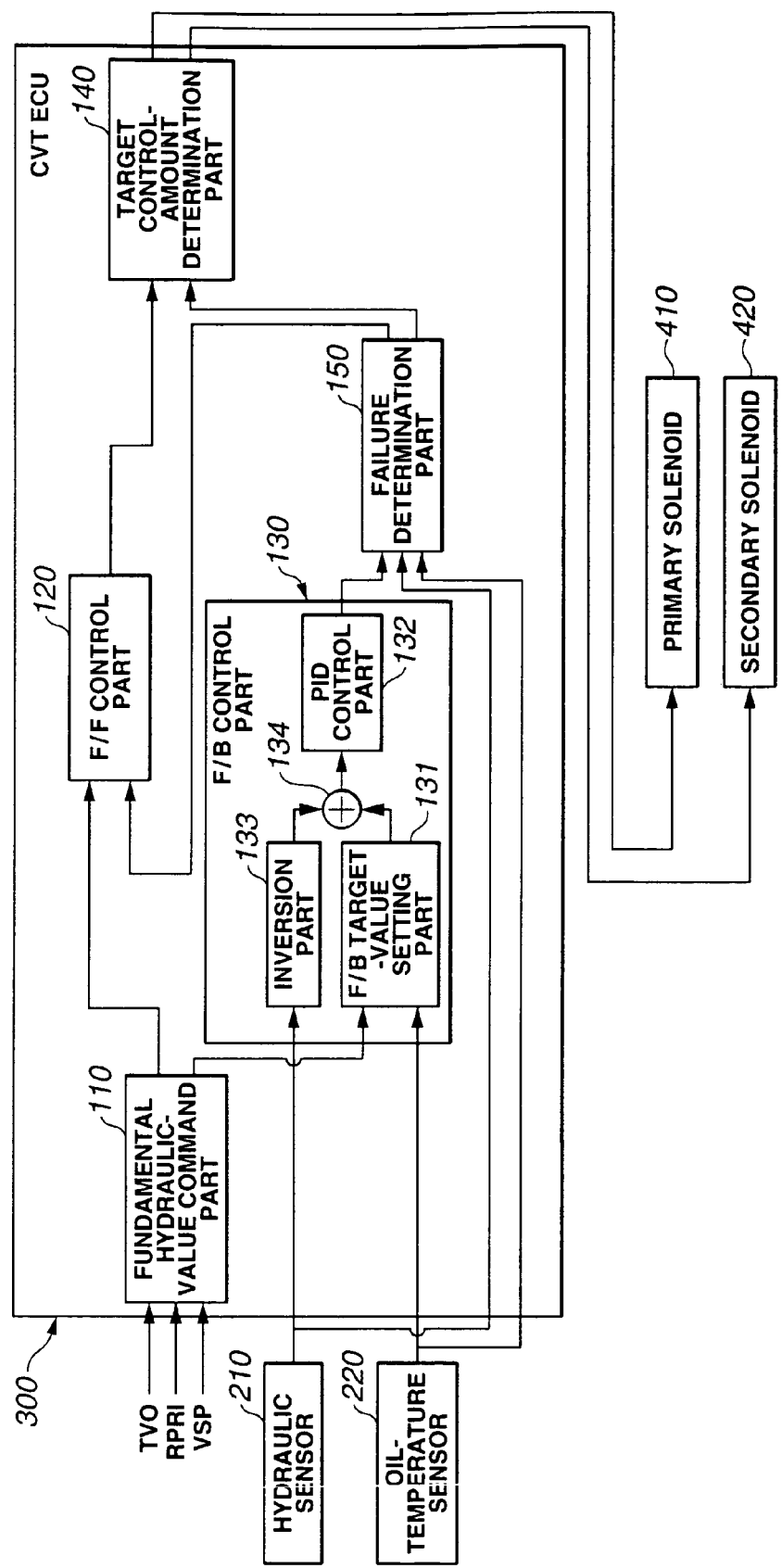
FIG. 6 is a block diagram showing control of the CVT mounted motor vehicle.

FIG. 6 shows control of the CVT ECU 300. Since the CVT ECU 300 is substantially the same in control structure as the ECU 100 in the first embodiment, its detailed description is omitted. In connection with the features when the CVT ECU 300 is applied to the CVT mounted motor vehicle, the fundamental hydraulic-value command part 110 comprises hydraulic maps corresponding to the throttle-valve opening TVO, primary revolution number RPRI, and vehicle speed VSP of the motor vehicle as plant to which the hydraulic controlled is applied. In accordance with values of the throttle-valve opening TVO, primary revolution number RPRI, and vehicle speed VSP, the fundamental hydraulic-value command part 110 reads a fundamental hydraulic-pressure command value for the CVT 310 to provide it to the F/F control part 120 and the F/B control part 130.

When the failure determination part 150 determines that no failure is found in the oil-temperature sensor 220, the detected oil temperature Tc is provided to the F/F control part 120 wherein opposite-phase compensation of the fundamental hydraulic-pressure command value P* provided from the fundamental hydraulic-value command part 110 is carried out through the inverse filter corresponding to the detected oil temperature Tc, outputting the first target hydraulic-pressure command value $P_1$ to the target control-amount determination part 140.

On the other hand, when the failure determination part 150 determines that the oil-temperature sensor 220 is faulty, the F/F control part 120 selects from the inverse filters an inverse filter corresponding to an 80° C. oil temperature. The 80° C. oil temperature is an oil temperature of the CVT 310 in a normal range of the motor vehicle. When the oil temperature 220 is faulty, an inverse filter is used corresponding to a normal range having higher service frequency.

The failure determination part 150 does not provide second target hydraulic-pressure command value $P_2$ when the hydraulic sensor 210 or the oil-temperature sensor 220 is faulty, or when the detected oil temperature Tc is smaller than −10° C. When the sensor is faulty, the oil conditions cannot be detected accurately. And when the temperature is very low, the oil viscosity increases to make detection of the hydraulic pressure difficult, leading to poor accuracy of F/B control of the hydraulic pressure. Consequently, a control amount of the CVT 310 is determined by F/F control only without relying on F/B control, achieving enhancement in control accuracy.

The target control-amount determination part 140 multiplies the first target hydraulic-pressure command value $P_1$ and the second target hydraulic-pressure command values $P_2$ provided from the F/F control part 120 and the failure determination part 150 by the independent gains $K_1$, $K_2$, respectively, which are superimposed one upon another, thus determining a target control amount for ensuring control of the primary and secondary solenoids 410, 420. In the case that the second target hydraulic-pressure command value $P_2$ is not provided when the hydraulic sensor 210 or the oil-temperature sensor 220 is faulty, or when the detected oil temperature Tc is smaller than −10° C., the gain $K_1$ as a multiplier of the first target hydraulic-pressure command value $P_1$ is set at 1 to determine a target control amount in accordance with the first target hydraulic-pressure command value $P_1$ only.

When designing the inverse filter in the F/F control part 120, since the hydraulic characteristics differ according to the vehicle model to which the hydraulic controller is applied, the hydraulic waveform of the CVT 310 in specific oil-temperature conditions is detected by experiment, and converted to into a transfer function out of which considering a target hydraulic responsivity of the plant, the inverse filter is designed. Moreover, a plurality of inverse filters are obtained by changing the oil-temperature conditions, obtaining a group of inverse filters covering all oil-temperature area corresponding to an operation area of the CVT 310 (refer to FIG. 2).

The CVT shown as an application of the hydraulic controller in the second embodiment requires control of high accuracy, since it achieves shifting by independently controlling the hydraulic pressures applied to the drive and driven pulleys. However, in the related art, since hydraulic vibrations are controlled by a simple primary lag filter, there is a limit to enhancement in control accuracy, leading to insufficient performance when using as the CVT controller to which control of high accuracy is required.

Moreover, in the CVT, the pulleys are slid to change the radiuses of rotation of the belt, achieving shifting. Thus, if hydraulic vibrations occur at sliding of the pulleys, the pulleys also vibrate accordingly. Occurrence of hydraulic vibrations causes unstable contact between the pulleys and the belt to make torque transmission from the pulleys to the belt insufficient, producing belt slippage, raising a problem of no achievement of a desired torque. Moreover, belt slippage may degrade fuel consumption and reduce the life of the pulleys and belt. Consequently, there is a need to carry out hydraulic control of high accuracy with hydraulic vibrations restrained.

On the other hand, in the second embodiment, using the inverse filter corresponding to the detected oil temperature, the F/F control part 120 carries out opposite-phase compensation of the fundamental hydraulic-pressure command value P* provided from the fundamental hydraulic-value command part 110, calculating the first target hydraulic-pressure command value $P_1$ having intensely suppressed vibration area of the fundamental hydraulic-pressure command P*. The F/B control part 130 carries out control so that a value of the actual hydraulic pressure $P_c$ follows the target hydraulic-pressure command value $P_{FB}$ for PID control, calculating the second target hydraulic-pressure command value $P_2$. The target control-amount determination part 140 multiples first and second target hydraulic-pressure command values $P_1$, $P_2$ by the independent gains $K_1$, $K_2$, respectively, which are superimposed one upon another, thus controlling the primary and secondary solenoids 410, 420.

With this, using the inverse filter, intensive opposite-phase compensation is provided to the vibration area to enhance both the responsivity and the vibrations restraint-ability, thus restraining hydraulic vibrations during control. This allows stable torque transmission between the pulleys and the belt with vibrations of the pulleys restrained, resulting in achievement of smooth shifting with belt slippage avoided.

Further, when the failure determination part 150 determines that the oil-temperature sensor 220 is faulty, the F/F control part 120 selects from the inverse filters an inverse filter corresponding to 80° C. oil temperature. With this, when the oil-temperature sensor 220 is faulty, F/F control is carried out using the inverse filter corresponding to 80° C. which is an oil temperature in a normal range of the motor vehicle. Thus, even if the oil-temperature sensor 220 is faulty, the hydraulic-vibrations controllability is secured in at least a normal range having higher service frequency, allowing operation of the CVT 310 while maximally restraining hydraulic vibrations (which corresponds to claim 8).

Still further, the failure determination part 150 does not provide second target hydraulic-pressure command value $P_2$ when the detected oil temperature Tc is smaller than −10° C. With this, even if the detected oil temperature Tc is smaller than −10° C. wherein the viscosity of oil in the CVT 310 increases extremely to make F/B control difficult, it can be avoided occurrence of hydraulic vibrations resulting from F/B control when having erroneous detection of the hydraulic pressure, resulting in enhancement in control accuracy (which corresponds to claim 9).

Furthermore, the CVT 310 is controlled in accordance with the first target hydraulic-pressure command value $P_1$ calculated in the F/F control part 120 including inverse filters and the second target hydraulic-pressure command value $P_2$ calculated in the F/B control part 130. With this, using the inverse filter, intensive opposite-phase compensation is provided to the vibration area, allowing provision of the hydraulic controller having both responsivity and vibrations restraint-ability enhanced (which corresponds to claim 10).

Further, it is determined whether or not the hydraulic sensor 210 is abnormal. And if it is determined that the hydraulic sensor 210 is abnormal, the CVT 310 is controlled in accordance with only the first target hydraulic-pressure command value $P_1$ calculated in the F/F control part 120. With this, even if the hydraulic sensor 210 is faulty, control using the inverse filter is carried out, allowing achievement of control having hydraulic vibrations restrained (which corresponds to claim 11).

Still further, it is determined whether or not the oil-temperature sensor 220 is abnormal. And if it is determined that the oil-temperature sensor 220 is abnormal, the CVT 310 is controlled in accordance with only the first target hydraulic-pressure command value $P_1$ calculated using the inverse filter corresponding to 80° C. which is an oil temperature in a normal range of the CVT 310. With this, even if the oil-temperature sensor 220 is faulty, the hydraulic-vibrations controllability is secured in at least a normal range having higher service frequency, allowing operation of the CVT 310 while maximally restraining hydraulic vibrations (which corresponds to claim 12).

Furthermore, when the detected oil temperature Tc is smaller than −10° C., the CVT 310 is controlled in accordance with the first target hydraulic-pressure command value $P_1$ only. With this, even if accurate detection of the hydraulic pressure is difficult due to degradation of the hydraulic responsivity caused by increase in oil viscosity at very low temperature, occurrence of hydraulic vibrations resulting from F/B control when having erroneous detection of the hydraulic pressure, resulting in enhancement in control accuracy (which corresponds to claim 13).

Having described the present invention in connection with the preferred embodiments, it is noted that the present invention is not limited thereto, and various changes and modifications can be made without departing from the scope of the present invention.

The entire teachings of Japanese Patent Application 2004-172385 filed Jun. 10, 2004 are hereby incorporated by reference.

What is claimed is:

1. A hydraulic controller, comprising:
   an actuator configured to electrically control a hydraulic pressure;
   a hydraulic-pressure sensing part configured to sense an actual value of the hydraulic pressure in the actuator;
   an oil-conditioning sensing part configured to sense an actual condition of oil; and
   an electronic control unit (ECU) configured to control the actuator, the ECU comprising:
      a fundamental hydraulic-pressure value command part configured to carry out setting and command of a fundamental hydraulic-pressure command value;
      a feedforward control part configured to calculate through an inverse filter a first target hydraulic-pressure command value in accordance with the fundamental hydraulic-pressure command value;
      a feedback control part configured to calculate a second target hydraulic-pressure command value in accordance with the sensed actual value of the hydraulic pressure and the fundamental hydraulic-pressure command value;
      a target control-amount determination part configured to determine a target control amount of the actuator in accordance with the first and second target hydraulic-pressure command values; and
      a first failure detection part configured to detect a failure of the hydraulic-pressure sensing part,
   wherein the feedforward control part comprises a plurality of inverse filters corresponding to the sensed actual condition of oil,
   wherein when the failure of the hydraulic-pressure sensing part is detected, the feedforward control part is configured to select from the plurality of inverse filters an inverse filter corresponding to the sensed actual condition of oil so as to carry out feedforward control,
   wherein when the failure of the hydraulic-pressure sensing part is detected, the target control amount is determined by the calculated first target hydraulic-pressure command value only, and
   wherein the ECU is configured to control the actuator in accordance with the determined target control amount.

2. The hydraulic controller as claimed in claim 1, wherein the actual condition of oil is an oil temperature, wherein the oil-condition sensing part includes an oil-temperature sensing part.

3. The hydraulic controller as claimed in claim 2, wherein the predetermined inverse filter corresponds to the oil temperature in a normal range of a control target to which the hydraulic controller is applied.

4. The hydraulic controller as claimed in claim 3, wherein the control target is a continuously variable transmission (CVT) which carries out shifting by independently controlling the hydraulic pressures applied to drive and driven pulleys,
   wherein the oil temperature in the normal range is 80° C.

5. The hydraulic controller as claimed in claim 2, wherein when the oil temperature is smaller than a predetermined value, the target control-amount determination part is configured to determine the target control amount by the first target hydraulic-pressure command value only.

6. The hydraulic controller as claimed in claim 5, wherein the predetermined value is 10° C.

7. A hydraulic controller, comprising:
   an actuator configured to electrically control a hydraulic pressure;
   a hydraulic-pressure sensing part configured to sense an actual value of the hydraulic pressure in the actuator;
   an oil-conditioning sensing part configured to sense an actual condition of oil; and
   an electronic control unit (ECU) configured to control the actuator, the ECU comprising:
      a fundamental hydraulic-pressure value command part configured to carry out setting and command of a fundamental hydraulic-pressure command value;
      a feedforward control part configured to calculate through an inverse filter a first target hydraulic-pressure command value in accordance with the fundamental hydraulic-pressure command value;
      a feedback control part configured to calculate a second target hydraulic-pressure command value in accordance with the sensed actual value of the hydraulic pressure and the fundamental hydraulic-pressure command value;
      a target control-amount determination part configured to determine a target control amount of the actuator in accordance with the first and second target hydraulic-pressure command values, and
      a second failure detection part configured to detect a failure of the oil-condition sensing part,
   wherein when the failure of the oil-condition sensing part is detected, the feedforward control part comprises a plurality of inverse filters corresponding to the sensed actual condition of oil,
   wherein when the failure of the oil-condition sensing part is detected, the feedforward control part is configured to select from the plurality of inverse filters a predetermined inverse filter so as to carry out feedforward control,
   wherein the target control amount is determined by the calculated first target hydraulic-pressure command value only, and
   wherein the ECU is configured to control the actuator in accordance with the determined target control amount.

8. A method of controlling a hydraulic controller which comprises an actuator electrically controlling a hydraulic pressure, a hydraulic-pressure sensing part sensing an actual value of the hydraulic pressure in the actuator, and an oil-condition sensing part sensing an actual condition of oil, the method comprising:

carrying out setting and command of a fundamental hydraulic-pressure command value;

calculating through an inverse filter a first target hydraulic-pressure command value in accordance with the fundamental hydraulic-pressure command value;

calculating a second target hydraulic-pressure command value in accordance with the sensed actual value of the hydraulic pressure and the fundamental hydraulic-pressure command value;

determining a target control amount of the actuator in accordance with the first and second target hydraulic-pressure command value;

detecting a failure of the hydraulic-pressure sensing part;

providing a plurality of inverse filters corresponding to the sensed actual condition of oil;

selecting from the inverse filters an inverse filter corresponding to the sensed actual condition of oil so as to carry out feed forward control when the failure of the hydraulic pressure is detected;

determining the target control amount by calculating only the first target hydraulic-pressure command value when there is a failure of the hydraulic-pressure sensing part; and controlling the actuator in accordance with the determined target control amount.

9. The method as claimed in claim 8, further comprising:

determining whether or not the hydraulic-pressure sensing part is abnormal;

determining, if it is determined that the hydraulic-pressure sensing part fails to be abnormal, the target control amount in accordance with the first and second target hydraulic-pressure command values; and determining, if it is determined that the hydraulic-pressure sensing part is abnormal, the target control amount in accordance with the first target hydraulic-pressure command value only.

10. The method as claimed in claim 8, further comprising:

determining whether or not a detection of an oil temperature is abnormal; and determining, if it is determined that the detection of the oil temperature is abnormal, the target control amount in accordance with only the first target hydraulic-pressure command value calculated using an inverse filter corresponding to the oil temperature in a normal range.

11. The method as claimed in claim 8, further comprising:

determining, when a detected oil temperature is smaller than a predetermined value, the target control amount in accordance with the first target hydraulic-pressure command value only.

* * * * *